US008233376B2

(12) United States Patent
Ilani

(10) Patent No.: US 8,233,376 B2
(45) Date of Patent: Jul. 31, 2012

(54) METHOD, APPARATUS AND SYSTEM FOR ESTIMATING CHANNEL TRANSFER MATRICES

(76) Inventor: Ishai Ilani, Modiin (IL)

( * ) Notice: Subject to any disclaimer, the term of this patent is extended or adjusted under 35 U.S.C. 154(b) by 353 days.

(21) Appl. No.: 12/065,531

(22) PCT Filed: Sep. 5, 2006

(86) PCT No.: PCT/IL2006/001028
§ 371 (c)(1),
(2), (4) Date: Jun. 17, 2010

(87) PCT Pub. No.: WO2007/029241
PCT Pub. Date: Mar. 15, 2007

(65) Prior Publication Data
US 2010/0278033 A1 Nov. 4, 2010

Related U.S. Application Data

(60) Provisional application No. 60/713,737, filed on Sep. 6, 2005, provisional application No. 60/740,248, filed on Nov. 29, 2005.

(51) Int. Cl.
*H04J 1/12* (2006.01)
(52) U.S. Cl. ........................................ 370/201; 370/252
(58) Field of Classification Search .................. 370/201, 370/252, 253, 286, 410
See application file for complete search history.

(56) References Cited

U.S. PATENT DOCUMENTS

| 7,551,544 B2* | 6/2009 | Laakso et al. ................. 370/201 |
| 2001/0004383 A1 | 6/2001 | Nordstrom et al. |
| 2001/0006510 A1 | 7/2001 | Nordstrom et al. |
| 2003/0128832 A1* | 7/2003 | Beltran et al. ................. 379/229 |
| 2005/0190826 A1* | 9/2005 | Van Bruyssel et al. ........ 375/222 |
| 2006/0062287 A1* | 3/2006 | Van Bruyssel ................ 375/222 |

OTHER PUBLICATIONS

Louveaux et al., "Downstream VDSL Channel Tracking using Limited Feedback for Crosstalk Precompensated Schemes", Acoustics, Speech and Signal Processing, 2005, Proceedings, ICASSP 2005, Mar. 18, 2005, pp. 337-340.
Leshem et al. "A Low Complexity Coordinated FEXT Cancellation for VDSL", Electronics, Circuits and Systems, 2004, ICECS 2004, Proceedings of the 2004 11th IEEE International Conference in Tel Aviv, Israel, Dec. 13-15, 2004, Piscataway, NJ, USA, IEEE, Dec. 13, 2004, pp. 338-341.
International Search Report for International Application No. PCT/IL2006/001028 mailed Feb. 1, 2007.

* cited by examiner

*Primary Examiner* — Gary Mui
(74) *Attorney, Agent, or Firm* — Daniel J. Swirsky; AlphaPatent Associates Ltd.

(57) ABSTRACT

A method, system and device for use in conjunction with Digital Subscriber Line (DSL) transmission systems, including Far-End Crosstalk (FEXT) cancellation circuitry. According to embodiments of the invention there is provided a system including a central office having a plurality of central modems, and at least one remote modem in communication with the plurality of central modems, the remote modem capable of automatic channel adjustment, and further capable of providing to the central office a channel adjustment parameter, wherein the central office includes a precoder to selectively precode symbols prior to transmission by each of the central modems with an estimation precoding matrix, and a controller to receive from the at least one remote modem respective channel adjustment parameters in response to transmitted symbols precoded with said estimation precoding matrix.

37 Claims, 6 Drawing Sheets

METHOD, APPARATUS AND SYSTEM FOR ESTIMATING CHANNEL TRANSFER MATRICES

CROSS-REFERENCE TO RELATED APPLICATIONS

This application is a National Phase Application of PCT International Application No. PCT/IL2006/001028, entitled "Method, Apparatus and System for Estimating Channel Transfer Matrices", International Filing Date Sep. 5, 2006, published on Mar. 15, 2007 as International Publication No. WO 2007/029241, which in turn claims priority from U.S. Provisional Patent Application Nos. 60/713,737, filed Sep. 6, 2005 and 60/740,248, filed Nov. 29, 2005, all of which are incorporated herein by reference in their entirety.

FIELD OF THE INVENTION

This present invention deals generally with Digital Subscriber Line (DSL) transmission systems, and particularly, with Far-End Crosstalk (FEXT) cancellation circuitry for a DSL transmission system.

BACKGROUND OF THE INVENTION

Discrete Multitone Transmission (DMT) systems are generally known with varieties of Asymmetric Digital Subscriber Line (ADSL) and Very high bit-rate Digital Subscriber Line VDSL, which implement DMT. Technology related to such systems is described in US Patent Publication No. 2001/0004383 (Nordstrom), entitled "DSL transmission system with far-end crosstalk compensation," and US Patent Publication No. 2001/0006510 (Nordstrom), entitled "DSL transmission system with far-end crosstalk cancellation," which are hereby incorporated by reference. Such systems may suffer from DownStream (DS) Far-End crosstalk (FEXT) noises effecting DSL modems.

A typical deployment of a DMT system (FIG. 1) may be a Point to Multi-Point configuration where multiple modems are collocated at one side, e.g., Central Office (CO), while the Customer Premises Equipment (CPE) are located at different customer locations and each CPE modem is connected to one of the CO modems. The transmission from the CO modems to the associated CPE modems is known as the Downstream (DS) transmission, and the capacity of the DS transmission is limited in many cases by the interference caused from leakage of the signals transmitted by the different CO modems into each of the CPE modems. This leakage signal is known as Far End Crosstalk (FEXT), thus the received signals at each of the CPE modems contain a mixture of desired signals and FEXT noise signals.

One (simplified) model for the DMT system described above is given by:

$$y = Hx + n \quad (1)$$

where x is a vector of symbols, whose coordinates are the transmission symbols along all the modems in the system (in the frequency domain), y is a vector of received symbols along all CPE modems (in the frequency domain), H is a channel matrix of complex scalars, where the diagonal elements represent the direct channel frequency response of the desired pair, and the off-diagonal elements represent the FEXT response between different pairs of channels, and n is the residual noise of the model.

Mitigation of the FEXT noise may be achieved by means of precoding. Several precoding methods have been presented by R. Cendrillon, G. Ginis, M. Moonen, J. Verlinden, T. Bostoen, "Improved Linear Crosstalk Precompensation for DSL," in IEEE International Conference on Acoustics, Speech and Signal Processing (ICASSP), May 2004, which is hereby incorporated by reference.

For example, one of the precoding methods comprises multiplying the transmission symbols x by a Cancellation Precoding Matrix F defined as $F = H^{-1} \text{diag}(H)$, prior to transmission, where diag(H) is the matrix whose diagonal elements are the diagonal elements of H, and its off diagonal elements are 0. The received symbols y could then be expressed as:

$$y = HH^{-1}\text{diag}(H)x + n = \text{diag}(H)x + n, \quad (2)$$

which is free of FEXT noise.

A necessary condition for implementing precoding solutions is knowledge of the channel matrix H. Once H is known, a Cancellation Precoding Matrix may be computed and precoding methods may be implemented. Common DMT equipment is capable of estimating the diagonal elements of H, but not of estimating the off-diagonal elements of H. Therefore, these methods do not offer a suitable solution for solving the entire channel matrix H.

Reference is made to FIG. 1, which depicts a DSL system 100 including a central office 110 having n transmitting Central Office (CO) modems, and n remotely located Customer Premises Equipment (CPE) modems 120.

Reference is now made to FIG. 2, a block flow diagram describing the transmitting data flow of a Point to Multi-Point DMT system at the CO 200. Multiple streams of data bits are encoded into multiple frequency domain symbols by the Mapper elements 210 of each modem. Typically, each modem processes one stream of data bits into multiple frequency bins, each frequency bin has its associated Mapper 210, which encodes data bits into a frequency domain symbol at the associated frequency bin. Furthermore, typically, the frequency domain symbols are chosen to be one of a predefined set of discrete constellation points, each constellation being defined by the number of points in the constellation and the minimal distance between any two points in the constellation. The frequency domain symbols at each modem independently are transformed into time domain symbols at the Inverse Fast Fourier Transform (IFFT) elements 220 of each modem. A Cyclic Prefix (CP) is added to each time domain symbol at the CP elements 230 of each modem by concatenating a certain predefined number of samples from the end of each time domain symbol to the beginning of each time domain symbol. The time domain symbols are further processed at the Analog Front End (AFE) elements 240 of each modem and transmitted to the various lines.

Reference is now made to FIG. 3, a block flow diagram describing a typical receiving data flow at the various ADSL CPE modems (collectively 300). Typically, each receiver works independently and without access to data in the other modems. Each receiver may convert the analog received signals into digital time domain samples at the AFE elements 310 of each receiver. A time domain filter at the TEQ elements 320 of each modem then preferably processes the time domain symbols. The outcomes of the TEQ elements are further processed by the "Remove CP" elements 330 of each modem, which partition the continuous samples of data into symbols of predefined length and remove a certain predefined number of samples from each symbol. The symbols of time domain samples are then processed by the Fast Fourier Transform (FFT) elements 340 of each modem, which transform the time domain symbols of each modem to frequency domain symbols. The vector of symbols for a specific frequency bin i over all modems is denoted by y. Note that for simplicity we omit the index i, but actually we get a multiple of vector y-s, one for each frequency bin. It will be noted that each CPE typically has access to only one coordinate of the vector y. Frequency Equalizer (FEQ) 350, which is typically a 1 tap complex linear adaptive filter, processes each of the frequency domain symbols to modified frequency domain symbols. The Slicer 360 then processes each of the modified frequency domain symbols into tentative decoded symbols, which are sent for further processing by Error Correction decoders and/or additional elements.

It will be noted that typically, the Frequency Equalizer (FEQ) 350 continuously adapts the values of the 1 tap complex filter using the difference between the modified frequency domain symbols and the tentative decoded symbols as an error estimate and using standard methods such as LMS adaptive filtering. As long as the difference between the modified frequency domain symbols at the receivers and the multiple frequency domain symbols at the Mapper output at the CO transmitters is smaller than half the minimal distance between Constellation points, the Slicer operates correctly. In order to ensure correct operation of the Slicer, the size of the Constellation points and initial values for the TEQ and FEQ parameters are typically set during a training period of the system, which is amply described in the prior art. Typically, the size of the Constellation points and initial values for the TEQ and FEQ parameters are set such that the relationship between each of the transmitted frequency domain symbols at the Mapper output of FIG. 2, denoted x, and each of the corresponding received frequency domain symbols at the FFT output of FIG. 3, denoted y, can be expressed as y=diag (H)x+n, and each coordinate of $\text{diag}(H)^{-1}n$ is smaller than half the minimal distance between Constellation points for the corresponding modem. Note that this model differs from model (1) presented above, as its first term diag(H)x does not include FEXT noise, thus the residual noise of this model will include the FEXT noise and will typically be greater than the residual noise in model (1). Further note that preferably such a model is generated for each of the frequency bins, each of which has its corresponding parameters including the channel matrix H, FEQ parameters, and constellation size. The TEQ parameters may typically be common to all the frequency bins, since the TEQ as presented in FIG. 3 operates on the time domain symbols prior to conversion to the frequency domain. However, there exist models in which the TEQ parameters may be set separately for each frequency bin.

A Point to Multi-Point DMT system as described above in FIGS. 2 and 3, where each transmitter modem processes one input stream and generates one output stream is known in the literature as a Single Input Single Output (SISO) system, or to be more precise it is an aggregate of SISO systems.

SUMMARY OF THE INVENTION

According to embodiments of the invention there is provided a system comprising a central office including a plurality of central modems; and at least one remote modem in communication with said plurality of central modems, said remote modem capable of automatic channel adjustment, and further capable of providing to said central office a channel adjustment parameter, wherein said central office includes a precoder to selectively precode symbols prior to transmission by each of said central modems with an estimation precoding matrix, and a controller to receive from said at least one remote modem respective channel adjustment parameters in response to transmitted symbols precoded with said estimation precoding matrix.

According to some embodiments of the invention, the controller may further be to provide said precoder with estimation precoding matrices for said plurality of central modems.

According to some embodiments of the invention, based on said channel adjustment parameters of said remote modems in response to transmitted precoded symbols said controller may be to calculate the far end cross talk (FEXT) response of said system.

According to some embodiments of the invention, said remote modems are capable of providing to said central office channel adjustment parameters in response to a query therefor.

According to some embodiments of the invention, the central office may further include a plurality of mapper elements to encode a respective plurality of data bit streams into frequency domain symbols in a plurality of frequency bins.

According to some embodiments of the invention, the central office may further include a vector assembler to assemble frequency domain symbols corresponding to each respective frequency bin into corresponding spatial vectors.

According to some embodiments of the invention, the precoder may be to selectively precode a predefined set of spatial vectors prior to transmission by said estimation precoding matrix into a set of spatial vectors of estimation precoded frequency domain symbols.

According to some embodiments of the invention, the system may further comprise means for transmitting said spatial vectors of estimation precoded frequency domain symbols according to DMT technology.

According to some embodiments of the invention, at least one of the remote modems may conform to at least one of the international ITU-T recommendations selected from the set consisting of G.992.1, G.992.2, G.992.3, G.992.5, G.993.1, and G.993.2.

According to some embodiments of the invention, the controller may further be to query said remote modems for said channel adjustment parameters.

According to some embodiments of the invention, the controller may further be to estimate the far-end crosstalk (FEXT) response of said system based on said channel adjustment parameters of said remote modems in response to transmitted precoded symbols.

According to embodiments of the invention, there may be provided a device comprising a controller to provide estimation precoding matrices for a plurality of central modems, and to receive from at least one remote modem respective channel adjustment parameter in response to transmitted symbols precoded with an estimation precoding matrix.

According to some embodiments of the invention, based on said channel adjustment parameters of said remote modems in response to transmitted precoded symbols, the controller may be to estimate the Far End Crosstalk (FEXT) response of said plurality of central modems to said at least one remote modem.

According to some embodiments of the invention, the channel adjustment parameters may be derived from the FEQ parameters of said at least one remote modem.

According to embodiments of the invention, there is provided a method of estimating Far End Crosstalk (FEXT) response between a plurality of central modems and at least one remote modem comprising selectively precoding symbols prior to transmission by each of said central modems with an estimation precoding matrix; and receiving from said at least one remote modem a channel adjustment parameter in response to transmitted symbols precoded with said estimation precoding matrix.

According to some embodiments of the invention, the method further comprises querying said at least one remote modem for said channel adjustment parameter.

According to some embodiments of the invention, the method further comprises estimating the FEXT response based on said channel adjustment parameter of said at least one remote modem in response to transmitted precoded symbols.

According to some embodiments of the invention, the method further comprises estimating the direct channel response of said at least one remote modem to respective at least one of said plurality of central modems prior to said step of selectively precoding symbols.

According to some embodiments of the invention, the method further comprises repeating said selective precoding symbols for a plurality of estimation precoding matrices, and receiving from said at least one remote modem respective channel adjustment parameters in response to transmitted symbols precoded with said plurality of estimation precoding matrices.

According to some embodiments of the invention, the method further comprises querying said at least one remote modem for said channel adjustment parameter for each of said plurality of estimating precoding matrices.

According to some embodiments of the invention, said querying is performed after stabilization of said channel adjustment parameters at said at least one remote modem for each of said plurality of estimating precoding matrices.

According to some embodiments of the invention, the method further comprises periodically repeating said estimating Far End Crosstalk (FEXT) response, thereby generating an estimate of said Far End Crosstalk (FEXT) response with each repetition.

BRIEF DESCRIPTION OF THE DRAWINGS

It would be desirable to develop methods for estimating the channel matrix H, including its off-diagonal elements, and by using such estimated channel matrix H, to compute and use a Cancellation Precoding Matrix based on knowledge of H.

The invention, both as to organization and method of operation, together with objects, features and advantages thereof, may best be understood by reference to the following detailed description of embodiments of the invention when read with the accompanied drawings in which.

Figure 1:
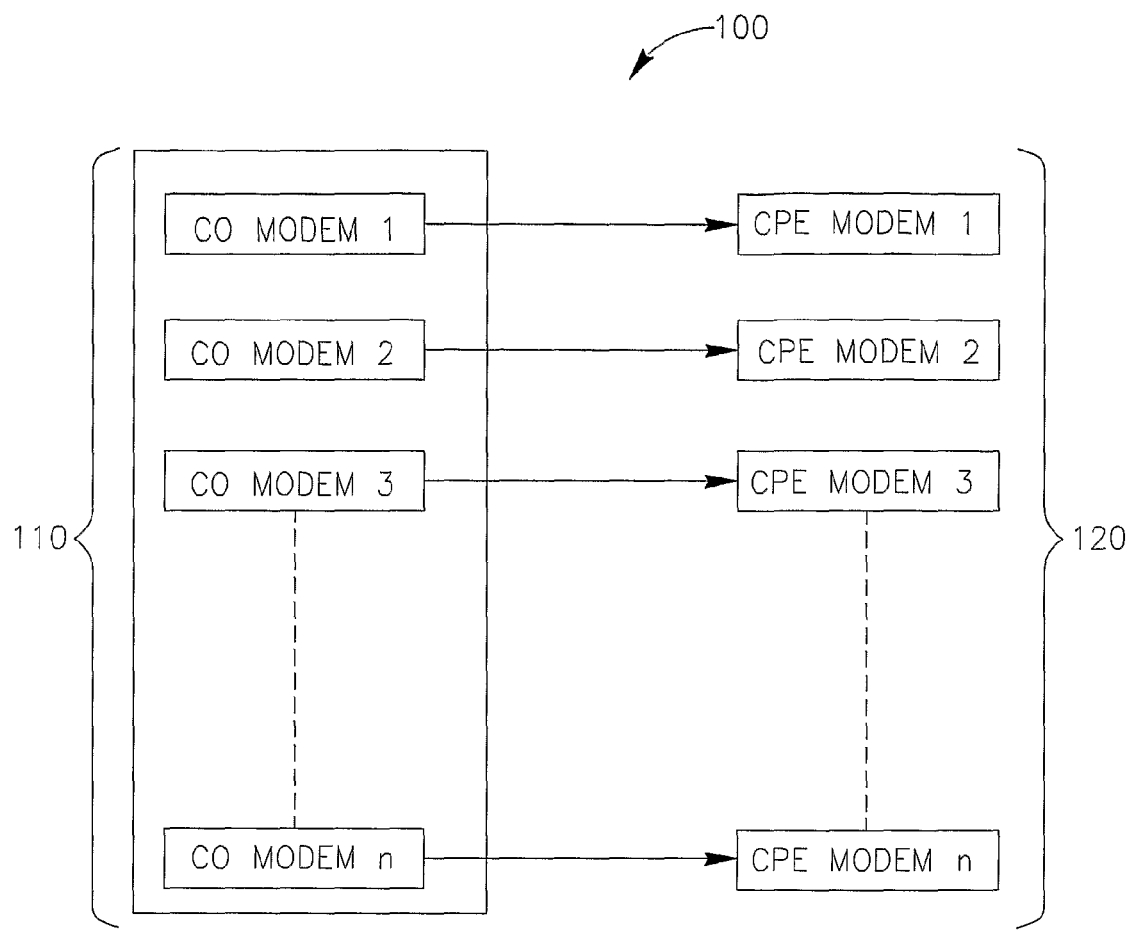
FIG. 1 is a schematic illustration of a DSL system generally.
Figure 2:
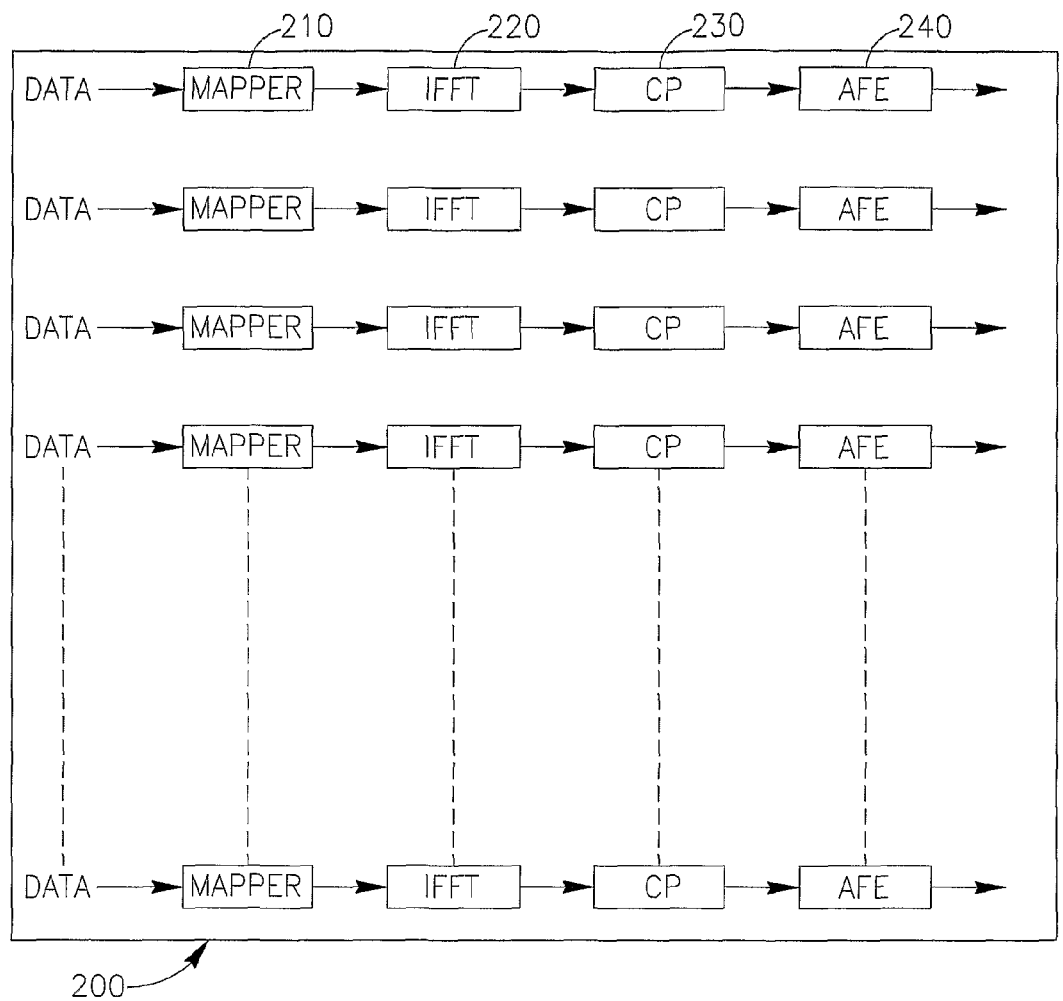
FIG. 2 is a schematic illustration of a DSL transmission system generally.
Figure 3:
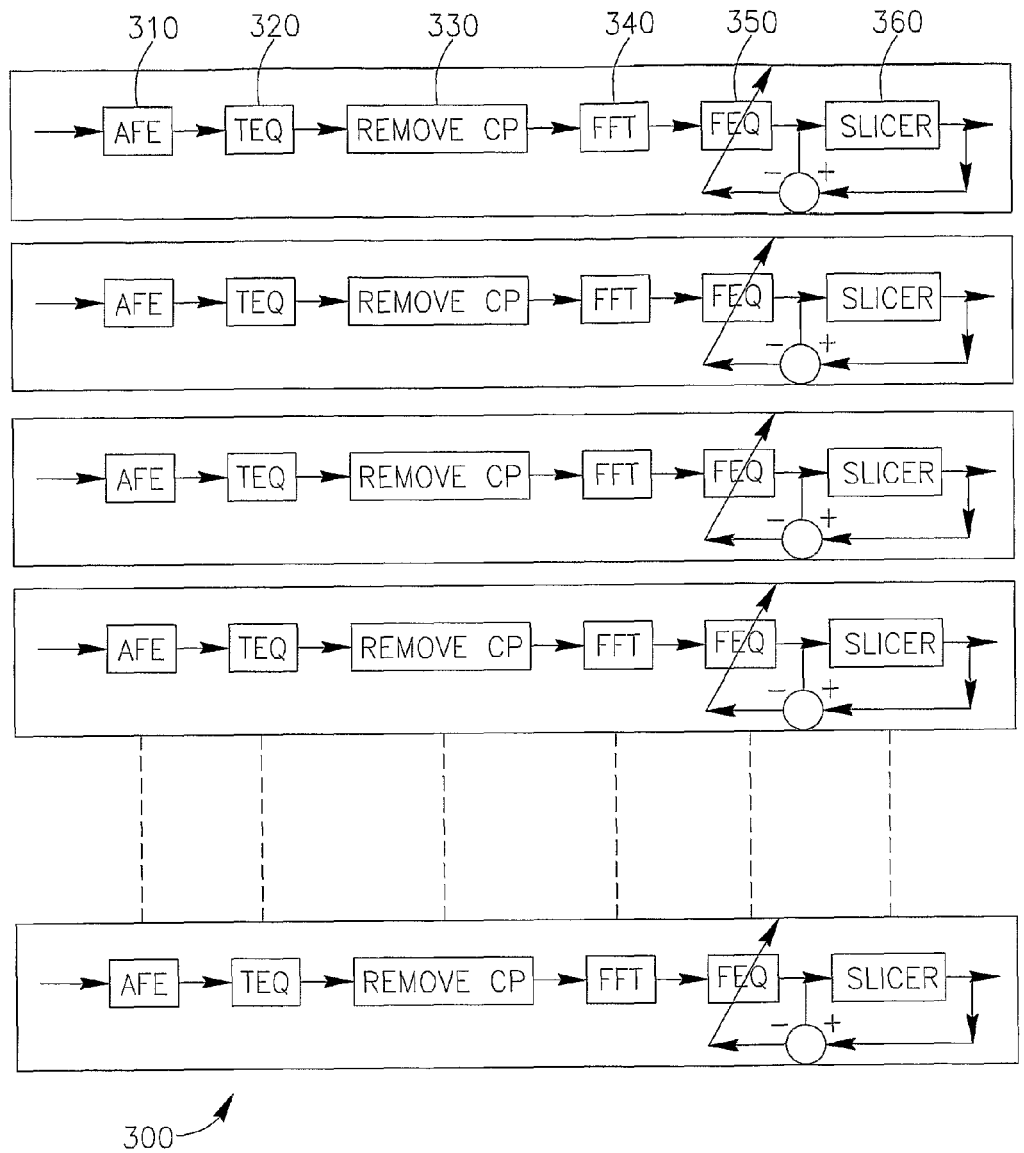
FIG. 3 is a schematic illustration of a DSL receiver system generally.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In accordance with the present invention, the diagonal elements (i.e., direct channel response) and off-diagonal elements (i.e., FEXT channel response) of the channel matrix H may be estimated using an Estimation Precoding Matrix. This matrix may then be used to produce a Cancellation Precoding Matrix to eliminate FEXT.

Figure 4:
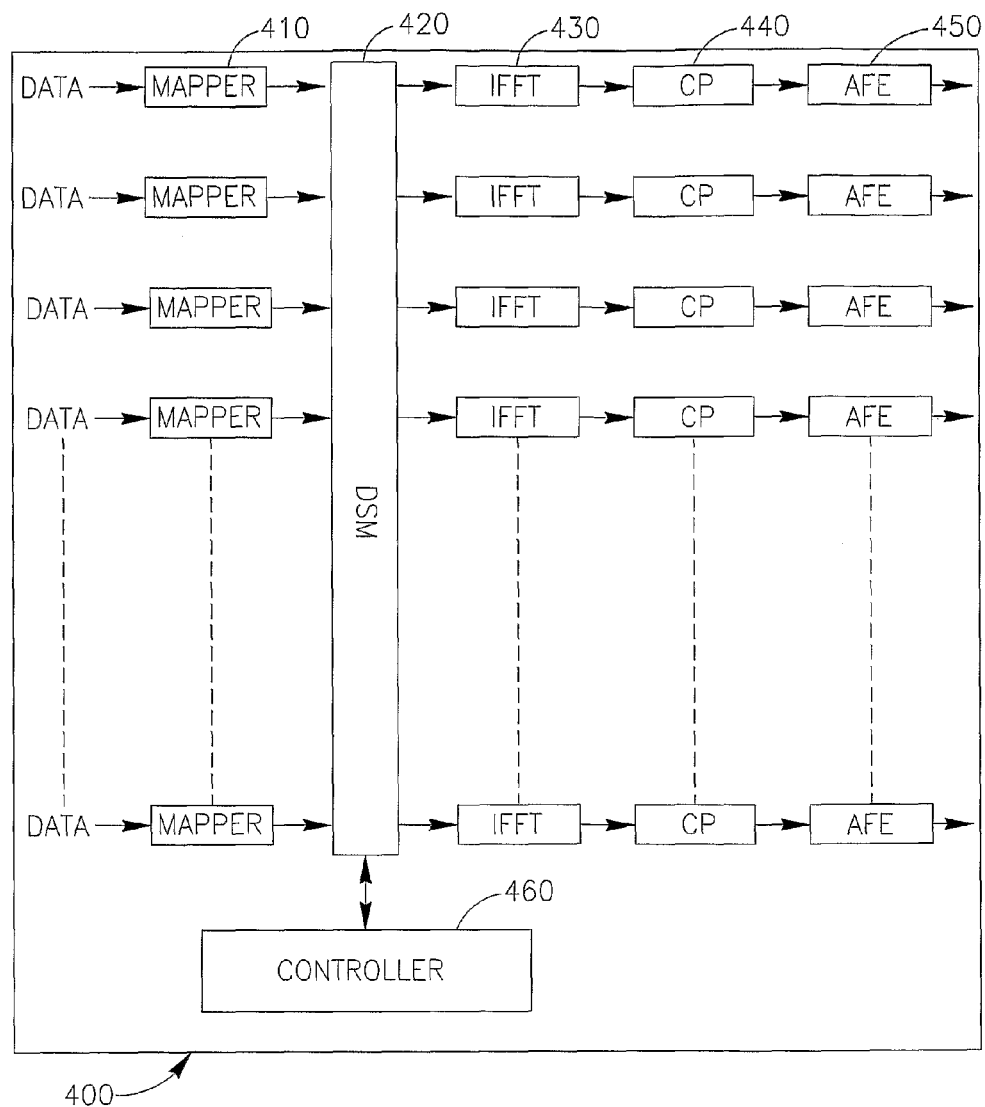
FIG. 4 is a schematic illustration of a DSL transmission system in accordance with an embodiment of the present invention.

Reference is now made to FIG. 4, which is a schematic illustration of a Point to Multi-Point DMT system at the CO 400, constructed and operative in accordance with embodiments of the present invention. Multiple streams of data bits may be encoded into multiple frequency domain symbols at the Mapper elements 410 of each modem. In the embodiment of the invention depicted, after the data is mapped, the frequency domain symbols for a predefined set of frequency bins may be processed by the Dynamic Spectral Management (DSM) element 420. In some embodiments of the invention, the DSM may comprise or include a vector assembler function or sub-unit that receives frequency domain symbols from some or all of the frequency bins and combines them into multiple spatial vectors, preferably the coordinates of each spatial vector x are the frequency domain symbols across all transmitting modems that are associated with a specific frequency bin. The DSM element may be implemented by various hardware or software techniques. For example, DSM element may be implemented in various ways, for example, by a Field Programmable Gate Array (FPGA) or an Application Specific Integrated Circuit (ASIC).

In operation, DSM element may process input spatial vector x according to an Estimation Precoding Matrix F, and thereby generate spatial vectors of Estimation Precoded frequency domain symbols Fx. That is, in an embodiment of the invention, DSM element 420 may multiply each of the spatial vectors x by a respective Estimation Precoding Matrix F. For simplicity, it may be assumed that the spatial vectors of Estimation Precoded frequency domain symbols Fx are generated for all frequency bins, where F=I for bins which no processing takes place. Transmission may then typically proceed as is known for DMT technology, e.g., through IFFT element 430, CP element 440 and AFE element 450, depicted in FIG. 4.

In embodiments of the present invention, the DSM may be controlled by a controller 460. Controller 460 may be connected to the DSM via a control channel or control bus. The control channel may be used to send and receive control signals to and from the DSM element, for example, to calculate and control the Estimation Precoding Matrix parameters, the channel matrix H, the Cancellation Precoding Matrix parameters, and other training functions. The control signals sent to the DSM element may include configuration signals for configuring the various Estimation Precoding Matrices, and control signals to be sent to the CPE modems (not shown) to query the FEQ parameters of each of the CPE modems. The received control signals may include or be calculated based on the FEQ parameters of the CPE modems.

It will be recalled that adaptive CPE modems, by definition of being adaptive, vary the FEQ parameters. These FEQ parameters may roughly correspond to diagonal values of the matrix H, where $y=Hx+n$. It will be understood here, and at relevant places herein, that the indices of the frequency bin may be omitted from the notation, and that such equation holds true for each frequency bin. Embodiments of the present invention may query the CPE modems for the FEQ parameters and use such parameters for computation purposes. In one embodiment, the DSM may multiply x before transmission by a known Estimation Precoding Matrix. In one embodiment of the invention, the Estimation Precoding Matrix F may be provided by $F=(I+\epsilon M)$, where I is the identity matrix, M is a bounded matrix, and $\epsilon \ll 1$ is a scalar value. Thus, after precoding and transmitting, the CPE modems may be queried for the resulting FEQ parameters. It will be appreciated that using the above Estimation Precoding Matrix, the vector y received at the CPE modems can be modeled as:

$$y=[H(I+\epsilon M)]X+N=Kx+n \quad (3)$$

Using this model, the diagonals of $K=H(I+\epsilon M)$ may be determined, and from suitable choices of the coefficients of M, the off-diagonal coefficients of H may be calculated. Generally, the diagonals of K, i.e., $k_{ii}$, may be modeled for any given i as follows:

$$k_{ii} = h_{ii} + \varepsilon \sum_{j=1}^{n}(h_{ij}m_{ji}) \quad (4)$$

For example, for a system of three transmitters and three receivers (i.e., n=3), and setting i=2, $$k_{22} = h_{22} + \varepsilon \sum_{j=1}^{3}(h_{2j}m_{j2}) = h_{22} + \varepsilon[(h_{21}m_{12}) + (h_{22}m_{22}) + (h_{23}m_{32})] \quad (5)$$

Insofar as $\epsilon$ and the coefficients of M are known, it will be appreciated that the off-diagonal coefficients of H in Eqn. (5), i.e., $h_{21}$ and $h_{23}$, can easily be determined by manipulation of M. Thus, for example, once $h_{22}$ is known, for example, by applying M=0, $h_{21}$ and $h_{23}$ may be deduced, respectively, by setting $m_{32}$ and $m_{12}$ to zero, and solving. A similar exercise may be performed on $k_{11}$ to determine $h_{12}$ and $h_{13}$ and on $k_{33}$ to determine $h_{31}$ and $h_{32}$ thereby solving the entire matrix H.

It will be appreciated that the above is merely a simple exercise intended to demonstrate solvability and not necessarily an algorithm for implementation. The devices and methods of the present invention are in no way limited in this regard. Different and/or more efficient methods of using the DSM to ascertain the entire matrix H may be derived using the principles of the present invention disclosed herein.

Figure 5:
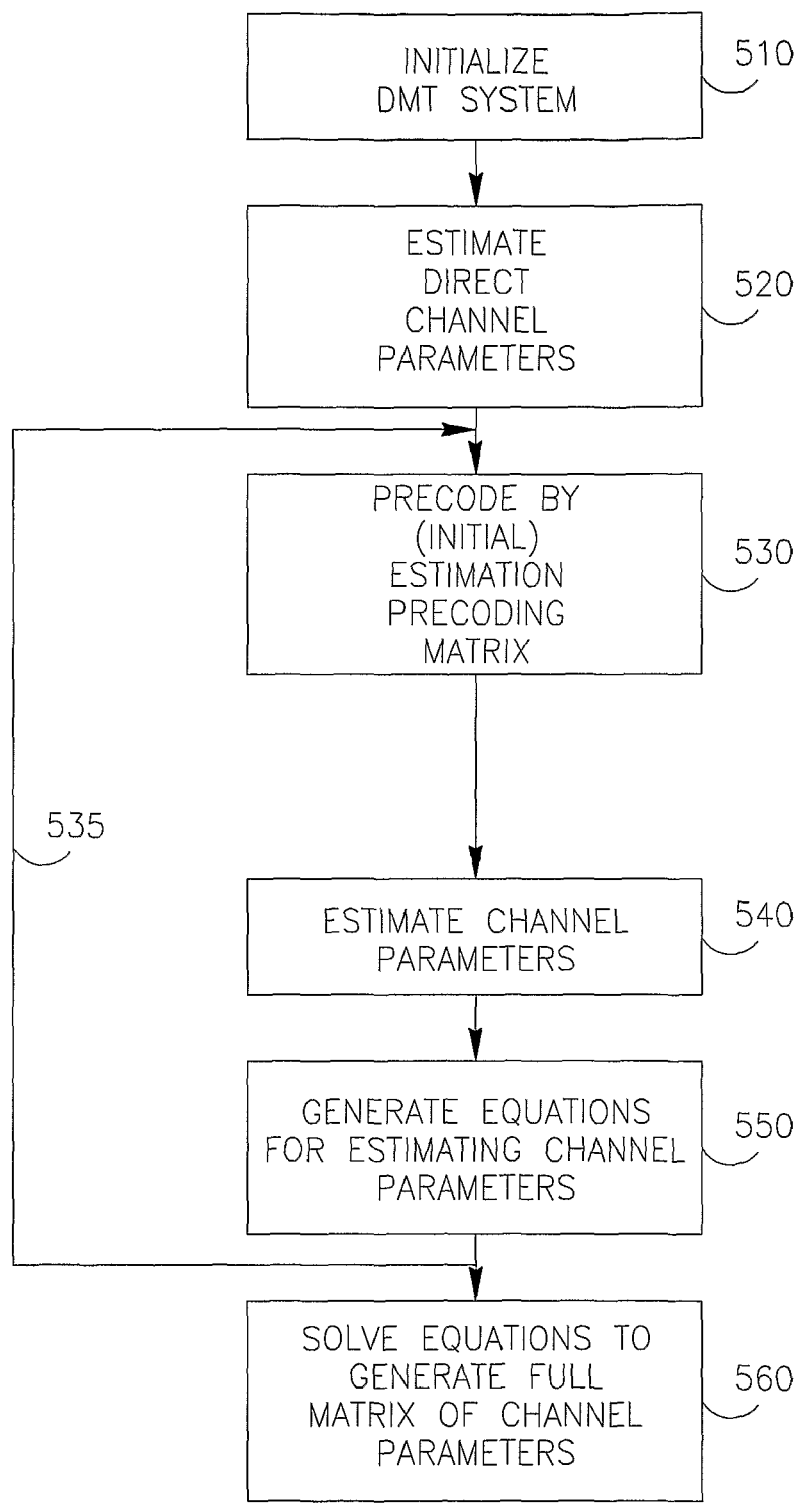
FIG. 5 is a schematic flow diagram of a method in accordance with an embodiment of the present invention.

Reference is now made to FIG. 5, which is a flow chart diagram describing a method of channel estimation in accordance with an embodiment of the present invention.

At block 510, a Point to Multi-Point DMT system may be initiated. In some embodiments of the invention, in order to simplify adaptation of existing systems for the purpose of implementing the present invention, the Point to Multi-Point DMT system may be initiated as an ordinary SISO DMT system.

At block 520, the direct channel responses may be estimated, for example, by querying the CPE modems for each of the channel adjustment parameters, e.g., FEQ parameters, thereat. It will be recognized that this querying may be performed and responses from the CPE modems may be received using existing and/or unaltered CPE modems known in the art. In some embodiments, the CPE equipment may conform to at least one international ITU-T recommendation, including, for example, G.992.1, G.992.2, G.992.3, G.992.5, G.993.1, and G.993.2.

At block 530, the spatial vector x may be precoded by Estimation Precoding Matrices $F=(I+\epsilon M)$. It will be recalled that the DSM may provide for different Estimation Precoding Matrices F for spatial vectors x of the different frequency bins. That is, there may be different $F_i$ for each $x_i$, where i is the frequency bin. In a first iteration, the estimation precoding matrix may be a default or initial matrix, whereas in subsequent iterations, the matrix may be calculated based on a predefined algorithm or according to channel adjustment parameters received from one or more remote modems.

It will be noted that for optimal results, these parameters should be read or sampled when the CPE FEQ parameters converge to a stable value. Thus, in some embodiments of the invention, the precoding of block 530 may take place during a minimum waiting period before block 540 is implemented in order to permit the channel adjustment parameter values to stabilize. In an exemplary embodiment of the invention, the estimation precoding matrices F are fixed for a certain period of time. Thus, for example, F may be kept fixed for any predetermined number, e.g., 1000, of mapped input symbols x, such that that number of consecutive symbols x are precoded by the same matrix F.

At block 540, the modified direct channel responses are estimated, for example, based on querying the CPE FEQ parameters. The parameters received from the CPE modems will be a function of the Estimation Precoding Matrix F, as well as the matrix H, which includes system Far End Crosstalk (FEXT) coefficients, represented by the off-diagonals of H.

At block 550, upon receiving the FEQ parameters from CPE receivers, a set of equations for estimating the channel matrix parameters may be generated based thereon.

As shown by arrow 535 in FIG. 5, in some embodiments of the invention, blocks 530, 540 and 550 may be repeated as necessary in order to provide continuous reading and adaptation of the Estimation Precoding Matrices. It may be advantageous to repeat blocks 530, 540 and 550 using different estimation precoding matrices, calculated to isolate or simplify solving one or more coefficients of the channel matrix. An example of using different estimation precoding matrices to isolate different channel matrix parameters is provided in FIG. 6, below.

At block 560, equations may be solved to generate a full channel matrix H of channel parameters, including the off-diagonal elements of H.

Figure 6:
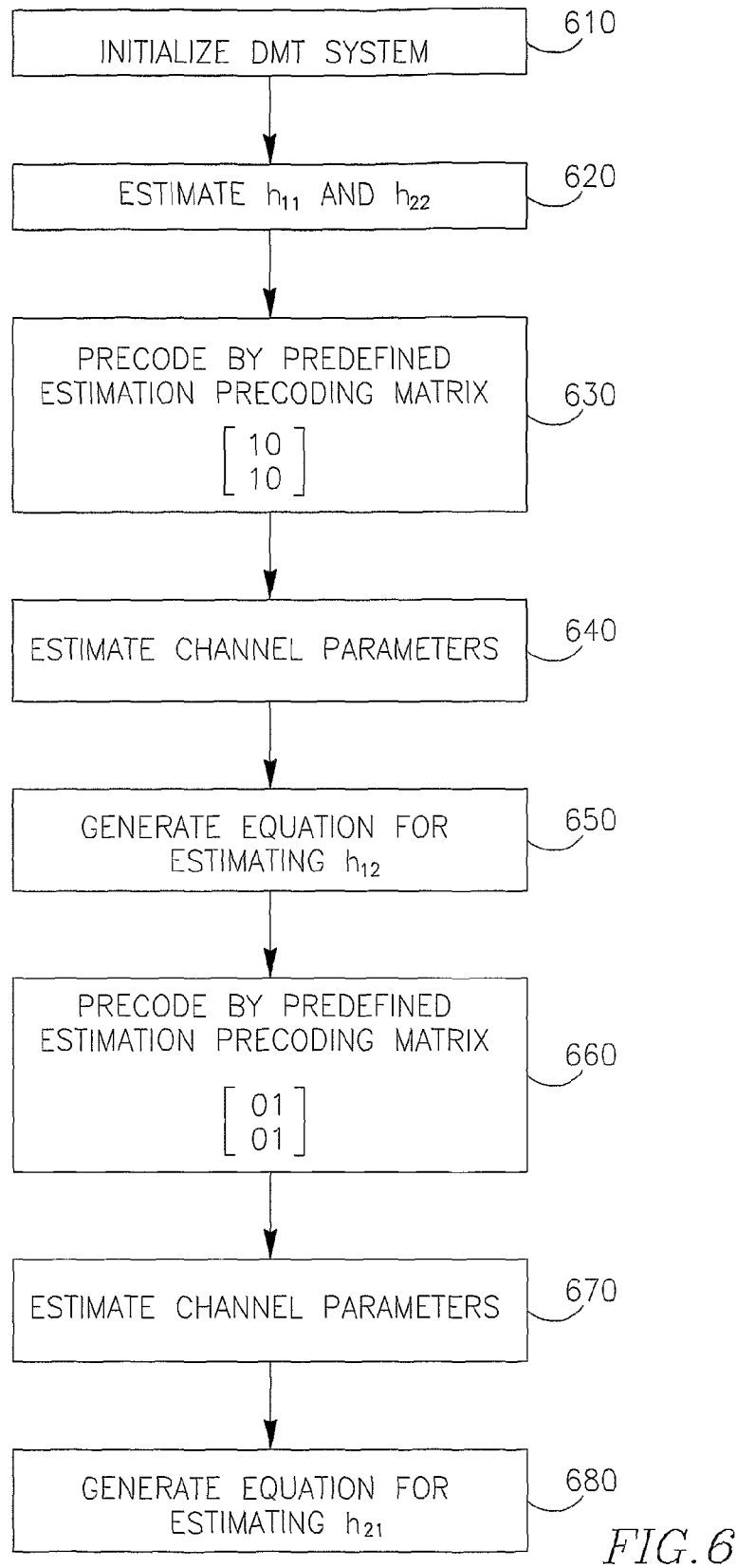
FIG. 6 is a schematic flow diagram of a method in accordance with an embodiment of the present invention.

Reference is now made to FIG. 6, which is a flow chart diagram describing the method of Channel Estimation constructed and operative in accordance with an embodiment of the present invention. For simplicity the method is described for estimation of H in a system of two transmitters and two receivers. We shall concentrate on a single frequency bin, and omit the index i for the frequency bin.

The matrix to be estimated is therefore:

$$H = \begin{pmatrix} h_{11} & h_{12} \\ h_{21} & h_{22} \end{pmatrix} \quad (6)$$

At block 610, the DMT system may be initialized, for example, as an ordinary point to multipoint SISO system.

At block 620, the diagonal elements $h_{11}$ and $h_{22}$ may be estimated. This estimation of the diagonal of H may be performed using known methods. For example, first, the CO modems may send a request for the FEQ parameters of the CPE modems. Next, each CPE modem may send its FEQ parameters to its associated CO modem, e.g., CPE modem 1 may send parameters back to CO modem 1, and CPE modem 2 may send parameters back to CO modem 2. Finally, $h_{11}$ and $h_{22}$ may be estimated from the FEQ parameters by ordinary methods.

With the knowledge of the diagonals of H, the off-diagonals may be estimated using an Estimation Precoding Matrix.

First, $h_{12}$ may be estimated, for example, using the Estimation Precoding Matrix:

$$F = \begin{pmatrix} 1 & 0 \\ 1 & 0 \end{pmatrix} \quad (7)$$

At block 630, for example, the Estimation Precoding Matrix F is used for precoding. This may be done by the CO, for example, by computing the spatial vector of frequency symbol x comprising 2 coordinates $x_1$ and $x_2$, which are the symbols to be transmitted on the first and second modem respectively, if precoding is not applied. The CO may then transmit the symbols $x_1$ on both transmitting modems, e.g., at the point preceding the IFFT block, the symbols to be transmitted on modem 2 may be replaced by the symbols to be transmitted by modem 1.

This operation may be repeated for a predefined number of symbols x at block 635, for example 1000 consecutive symbols x must be precoded by the matrix F. At block 640, after waiting for the channel parameters to stabilize, CO modem 1 may request the FEQ parameter from CPE modem 1. For a typical implementation of VDSL the value of $h_{12}$ is much smaller than $h_{11}$. Therefore the decision mechanism of the receiver of modem 1, namely the Slicer, will not be affected, and after a waiting period (e.g., 1000 symbols in the above example) the value of the FEQ parameter may converge to a function of both $h_{11}$ and $h_{12}$. Thus, at block 650, $h_{12}$ may be estimated by previously known $h_{11}$ and the FEQ parameter of the previous step.

Next, $h_{21}$ may be estimated, for example, using the Estimation Precoding Matrix:

$$F = \begin{pmatrix} 0 & 1 \\ 0 & 1 \end{pmatrix} \quad (8)$$

At block 660, for example, the CO may compute symbols $x_2$ to be sent on the second modem. The CO may then transmit the symbols $x_2$ on both transmitting modems, e.g., at the point preceding the IFFT block, the symbols to be transmitted on modem 1 may be replaced by the symbols to be transmitted by modem 2.

At block 670, after waiting for the channel parameters to stabilize, CO modem 2 may request the FEQ parameter from CPE modem 2. The value of the FEQ parameter may be a function of both $h_{22}$ and $h_{21}$. Thus, at block 680, $h_{21}$ may be estimated by previously known $h_{22}$ and the FEQ parameter of the previous step.

It will be noted that blocks 660, 670 and 680 used for calculating $h_{21}$ are essentially repetitions (with the necessary changes) of blocks 630, 640 and 650, used for calculating $h_{12}$.

In some embodiments of the invention, off-diagonal elements may be learned concurrently. Thus, a variant of the preceding exemplary method may learn $h_{12}$ and $h_{21}$ concurrently. In such an embodiment, it may be optimal for the relevant modems, e.g., modem 1 and modem 2, to operate with essentially the same or similar constellation points on the relevant frequency bin. In some CPE modems, it may be possible to force the same constellation points on both modems, thereby simplifying the estimation procedure.

In some cases, it may be necessary to freeze the FEQ parameter of some modems while other modems are adapting. Thus, for example, modem 2 may be frozen while modem 1 is learning $h_{12}$, in order that the FEQ parameter of modem 2 will not adapt in an undesired direction.

One embodiment of the present invention may transmit on modem 2 $\alpha(t)x_1$, where $\alpha(t)$ is a monotonic increasing function of time. This may be necessary to ensure a smooth adaptation of the FEQ parameter of CPE modem 1.

The method of the present invention may be repeated on a regular or otherwise periodic basis to update the estimation of the channel matrix.

Extending the method of the invention to multiple modems is straightforward and may be done with a variety of variations on the basic estimation scheme described above.

In another embodiment of the invention, a system comprising multiple CO modems, each of which is connected to a CPE modem compatible with the G.992, G.993 ITU-T recommendations, may be first initiated as multiple SISO modems, and then seamlessly convert into a FEXT Cancellation mode. Thus, for example, using the notation above the channel may be modeled as:

$$y = Hx + n \quad (9)$$

According to this embodiment of the invention, the system may initialize as a system of n ordinary SISO modems, where n is the number of CO modems, and typically also the number of CPE modems. Then, n invertible matrices are chosen, $M^{(1)}, M^{(2)}, \ldots M^{(n)}$, each having order n by n. Then, n matrices $\overline{M}^{(1)}, \overline{M}^{(2)}, \ldots, \overline{M}^{(n)}$, may be constructed such that $\overline{M}^{(j)}$ is comprised of the concatenation of the j-th columns of the matrices $M^{(1)(T)}, M^{(2)T}, \ldots, M^{(n)T}$, i.e., column k of $\overline{M}^{(j)}$ is the j-th column of $M^{(k)T}$ for all k=1 . . . n. The individual entries may be related via: $\overline{m}_{ik}^{(j)} = m_{ji}^{(k)}$. In this embodiment, the estimation may include n iterations. For each iteration j, the CO may use the Estimation Precoding Matrix $\overline{M}^{(j)}$, so the equivalent channel seen by the CPE modem will be: $K^{(j)} = H \overline{M}^{(j)}$. The FEQ of the CPE modem may then adapt (automatically) to the value:

$$k_{ll}^{(j)} = \sum_i h_{li} \overline{m}_{il}^{(j)} = \sum_i m_{ji}^{(l)} h_{li}, \quad (10)$$

(or to a function of this value)

The CO modems may send a request to the CPE modems, e.g., each CO modem to its corresponding CPE modem, to receive the FEQ values. The CO modems may then compute the values $k_{ll}^{(j)}$ for all l=1 . . . n. from the FEQ values sent by the CPE modems.

After concluding all n iterations, the CO modems may compute all the channel parameters. The parameters $h_l = (h_{l1}, h_{l2}, \ldots, h_{ln})^T$ for a fixed l may be computed as:

$$h_l = (M^{(l)})^{-1} k_{ll}, \quad (11)$$

with $k_{ll}$ defined as:

$$k_{ll} = (k_{ll}^{(1)}, k_{ll}^{(2)}, \ldots, k_{ll}^{(n)})^T. \quad (12)$$

In some embodiments of the invention, refinements of the above-described method may be necessary in order to ensure proper operation. These refinements may be necessary, for example, in order to ensure that the precoded matrices do not disturb the CPE modems—which may not be aware to the precoding—from receiving the information sent by the CO modems, and in order to ensure a smooth adaptation of the FEQ parameters. Thus, matrices $M^{(j)}$ may be chosen such that all the elements of $\overline{M}^{(i)}=I+\epsilon M$ I will be of the same order of magnitude and will all be much smaller than 1, for all i=1 . . . n. In other words, each of the matrices $\overline{M}^{(i)}$ should satisfy the equation $\overline{M}^{(i)}=I+\epsilon M$ for some bounded matrix M, and small $\epsilon$. During each iteration, the power on the off-diagonal elements may be initially set to a low level, and then slowly increase to ensure smooth convergence of the FEQ parameters. For example, the Estimation Precoding Matrix may be: $\overline{M}^{(j)}=I+\alpha(t)\epsilon M$, with $\alpha(t)$ a slowly monotonic increasing function with $\alpha(0)<<1$.

In some embodiments of the invention, the diagonal elements of the channel matrix H may be computed from transmission without any pre-coding matrix, e.g., $\overline{M}^{(1)}=I$. The diagonal elements may be computed from the FEQ parameters of the first iteration, and the remaining iterations will determine the off-diagonal elements.

In another embodiment of the invention, a system comprising multiple CO modems, each of which is connected to a CPE modem compatible with the G.992, G.993 ITU-T recommendations, may be first initiated as multiple SISO modems, and then seamlessly convert into a FEXT Cancellation mode. Thus, for example, a system including multiple CO modems, each of which is connected to a CPE modem compatible with one of the G.992, G.993 ITU-T series of recommendations may be first initiated as multiple SISO modems, and then seamlessly converted into a FEXT cancellation mode.

Using the familiar notation above the channel may be modeled as y=Hx+n. Denoting the number of modems at the CO by n, the method of this embodiment follows by first initializing the system as a system of n ordinary SISO modems. Next, n matrices $\overline{M}^{(1)}, \overline{M}^{(2)}, \ldots, \overline{M}^{(n)}$, may be constructed such that $\overline{M}^{(j)}$ is the matrix whose diagonal elements are all 1-s, and its off diagonal elements are all 0-s, except for the j-th row whose off diagonal elements are small numbers, for example the j-th row off diagonal elements are all equal to $\epsilon$, where $\epsilon<<1$. The estimation may include n iterations. During any iteration j, the CO may use the Estimation Precoding Matrix $\overline{M}^{(j)}$, so the equivalent channel seen by the CPE modem will be: $k^{(j)}=H\overline{M}^{(j)}$. The FEQ of the CPE modem 1 for l≠j may then adapt (automatically) to a function of the value $k_{ll}^{(j)}=\epsilon h_{ll}+h_{ll}$. Upon stabilization, the CO modems may send requests to the respective CPE modems for the FEQ parameters. At iteration j, the CO modems may compute values $h_{lj}$ for all l=1 . . . n, where l≠j from the FEQ values sent by the CPE modems.

In general, receiving modem 1 may provide FEQ parameters different from the FEQ parameter associated with $h_{ll}$, when the l-th column of the Estimation Precoding Matrix is of the from $e_l+\delta$, where $e_l$ is the l-th column of the identity matrix I, and $\delta$ is a vector whose norm is much smaller than 1, but $\delta$ is not a scalar multiple of $e_l$.

In an exemplary embodiment of the invention, an approximation of the off diagonal elements of the j-th column of a Cancellation Precoding matrix F can be estimated by: $(F)_{lj} = h_{lj}/h_{ll}$, insofar as the diagonal elements are preferably estimated as 1. Further, in an exemplary embodiment, the Cancellation Precoding Matrix estimated at iteration j may be used by following iterations to increase precision of the estimation process. Thus if the Cancelation Precoding Matrix, which was computed at iteration j is $F_j$, the Precoding Matrix which will be used in iteration j+1 is $F_j\overline{M}^{(j+1)}$ In some embodiments of the invention, the method may be used on a periodic basis to update the estimation of the channel matrix, and to provide approximations to Cancellation Precoding matrices. For example, Estimation Precoding Matrices $\overline{M}^{(j)}$, may be applied after a Cancellation Precoding Matrix F has been applied. In this case the equivalent channel matrix will be HF, and by applying Estimation Precoding Matrices $\overline{M}^{(j)}$, an Estimation of the off-diagonal elements of HF may be computed, and as a result a better estimate of the Far End Crosstalk (FEXT) response may be computed as well.

In some embodiments of the invention, the method may be used to introduce a new modem into a system of already working modems implementing FEXT cancellation. In exemplary embodiments, the new modem may train with reduced power levels and increase its power level to normal power only after the existing modems have learned its channel coefficients, and the Cancellation Precoding Matrix was updated.

It will be apparent that the devices and methods according to embodiments of the invention will be applicable to DSL, VDSL and other systems. For example, the method and system of the invention may be applicable to wireless communications, in particular MIMO wireless communications using OFDM modulation.

In general, embodiments of the invention may be applicable to any communication system that conforms to a model in which (a) the relationship between a transmitted vector signal x by a plurality of central modems, and a received vector signal y by at least one remote modems is given by an equation of the type y=Hx+n; (b) some or all of the remote modems are capable of automatic channel adjustment, e.g., have a learning capability of the diagonal elements of H; (c) the above learning capability is adaptive; (d) some or all of the remote modems are capable of providing to the central office channel adjustment parameters; and (e) the transmitter device may selectively precode the symbols to be transmitted by an Estimation Precoding Matrix.

It should be clear that the description of the embodiments and attached figures set forth in this specification serve only for a better understanding of the invention and embodiments thereof, without limiting its scope as covered by the following claims. It should also be clear that a person skilled in the art, after reading the present specification can make adjustments or amendments to the attached figures and above described embodiments that would still be covered by the following claims.

The invention claimed is:

1. A system comprising:
a central office including a plurality of central modems; and
at least one remote modem configured to communicate with said plurality of central modems, wherein said remote modem is further configured to perform automatic channel adjustment, and to provide to said central office a channel adjustment parameter wherein one or more symbols transmitted via said plurality of central modems to said remote modem are transformed by a channel response having a direct channel response and a far end cross talk (FEXT) response,
wherein said central office includes
a precoder configured to precode one or more symbols by applying an estimation precoding matrix to said symbols prior to any of said central modems transmitting any of said precoded symbols; and
a controller configured to
select a set of coefficients of the far end cross talk (FEXT) response between said plurality of central modems and said at least one remote modem, calculate said estimation precoding matrix as a first function of said set of selected coefficients, wherein precoding said symbols by said calculated matrix and transmitting said precoded symbols via said central modems causes said channel adjustment parameter at said remote modem to converge to a second function of said selected coefficients, and receive said channel adjustment parameter from said at least one remote modem in response to said central modems transmitting said precoded symbols to said remote modem.

2. The system of claim 1, wherein said controller is further configured to provide said precoder with said estimation precoding matrix.

3. The system of claim 1, wherein based on said channel adjustment parameter of said remote modem in response to transmitted precoded symbols said controller is configured to calculate at least one of said selected coefficients of the far end cross talk (FEXT) response of said system.

4. The system of claim 3, wherein said remote modems are capable of providing to said central office channel adjustment parameters in response to a query therefor.

5. The system of claim 1, wherein said central office further includes a plurality of mapper elements to encode a respective plurality of data bit streams into frequency domain symbols in a plurality of frequency bins.

6. The system of claim 1, wherein said central office further includes a vector assembler to assemble frequency domain symbols corresponding to each respective frequency bin into corresponding spatial vectors.

7. The system of claim 1, wherein said precoder is configured to selectively precode a predefined set of spatial vectors prior to transmission by said estimation precoding matrix into a set of spatial vectors of estimation precoded frequency domain symbols.

8. The system of claim 7, further comprising means for transmitting said spatial vectors of estimation precoded frequency domain symbols according to DMT technology.

9. The system of claim 1, wherein said at least one of remote modems conforms to at least one of the international ITU-T recommendations selected from the set consisting of G.992.1, G.992.2, G.992.3, G.992.5, G.993.1, and G.993.2.

10. The system of claim 1, wherein said controller is further configured to query said remote modems for said channel adjustment parameters.

11. The system of claim 1, wherein said controller is further configured to estimate the far-end crosstalk (FEXT) response of said system based on said channel adjustment parameters of said remote modems in response to transmitted precoded symbols.

12. The system of claim 1, wherein said controller is further configured to calculate said estimation precoding matrix using information that is independent of said far end cross talk (FEXT) response and independent of said direct channel response.

13. The system of claim 1, wherein
said plurality of central modems includes a predefined number n of modems;
said at least one remote modem includes said n remote modems;
the channel response between the central modems and the remote modems is modeled as an n×n matrix H, including diagonal elements and off-diagonal elements; and
the far end crosstalk response are the off-diagonal elements of H.

14. The system of claim 13, wherein each of the remote modems has a decision mechanism configured to compute decoded symbols as a function of analog signals received by the each of the remote modems, and said controller is configured to calculate any of said estimation precoding matrices in the form I+εM wherein ε is chosen to be significantly less than 1 in absolute value ($|\epsilon|\ll 1$) such that the decision mechanism at the remote modems will not be affected by the precoding ; and M is calculated as a first function of said set of selected coefficients, wherein precoding said symbols by said matrix I+εM and transmitting said precoded symbols to said remote modem causes said channel adjustment parameter at said remote modem to converge to a second function of said selected coefficients.

15. The system of claim 14, wherein said second function of said selected coefficients is a function of predefined elements of the matrix H(I+εM).

16. The system of claim 15 wherein said predefined elements of the matrix H(I+εM) are diagonal elements of the matrix H(I+εM).

17. A controller configured to communicate with a plurality of central modems wherein said controller is further configured to
select a set of coefficients of a far end cross talk (FEXT) response between said plurality of central modems and at least one remote modem wherein one or more symbols transmitted via any of said plurality of central modems to said remote modem are transformed by a channel response having a direct channel response and said far end cross talk (FEXT) response, calculate an estimation precoding matrix as a first function of said set of selected coefficients, wherein precoding said symbols by said calculated matrix and transmitting said precoded symbols via said central modems causes a channel adjustment parameter at said remote modem to converge to a second function of said selected coefficients, provide said calculated matrix to a precoder configured to precode one or more symbols by applying said calculated matrix to said symbols prior to transmitting any of said precoded symbols via any of said central modems; and receive from at least one remote modem respective response to said central modems transmitting aid precoded symbols to said remote modem.

18. The controller of claim 17, wherein said respective response comprises said channel adjustment parameter, and wherein based on said channel adjustment parameter of said at least one remote modem in response to transmitted precoded symbols, said controller is configured to estimate at least one of said selected coefficients of the far end crosstalk (FEXT) response.

19. The controller of claim 18, wherein said channel adjustment parameters are derived from frequency equalizer (FEQ) parameters of said at least one remote modem.

20. The controller of claim 17, wherein said controller is further configured to calculate said estimation precoding matrix as a function of information that is independent of said far end cross talk (FEXT) response and independent of said direct channel response.

21. The controller of claim 17, wherein
said plurality of central modems includes a predefined number n of modems;
said at least one remote modem includes said n remote modems;

the channel coefficients between the central modems and the remote modems is modeled as an n×n matrix H, including diagonal elements and off-diagonal elements; and the far end crosstalk response coefficients are the off-diagonal elements of H.

22. The controller of claim 17, wherein each of the remote modems has a decision mechanism configured to compute decoded symbols as a function of analog signals received by the each of the remote modems, and said controller is configured to calculate any of said estimation precoding matrices in the form I+εM wherein ε is chosen to be significantly less than 1 in absolute value (|ε|<<1) such that the decision mechanism at the remote modems will not be affected by the precoding ; and M is calculated as a first function of said set of selected coefficients, wherein precoding said symbols by said matrix I+εM and transmitting said precoded symbols to said remote modem causes said channel adjustment parameter at said remote modem to converge to a second function of said selected coefficients.

23. The controller of claim 22, wherein each of said second function of said selected coefficients is a function of predefined elements of the matrix H(I+εM).

24. The controller of claim 23, wherein said predefined elements of the matrix H(I+εM) are diagonal elements of the matrix H(I+εM).

25. A method of estimating a far end crosstalk (FEXT) response between a plurality of central modems and at least one remote modem, wherein one or more symbols transmitted via any of said plurality of central modems to said remote modem are transformed by a channel response having a direct channel response and said far end cross talk (FEXT) response, the method comprising:

selecting a set of coefficients of the far end cross talk (FEXT) response calculating an estimation precoding matrix as a first function of said set of selected coefficients, wherein precoding one or more symbols by said calculated matrix and transmitting said precoded symbols via said central modems causes a channel adjustment parameter at said remote modem to converge to a second function of said selected coefficients precoding said symbols by applying said calculated matrix to said symbols prior to transmitting any of said precoded symbols via any of said central modems;

transmitting said precoded symbols via said central modems, and receiving from said at least one remote modem a response to said central modems transmitting said precoded symbols to said remote modem.

26. The method of claim 25, wherein said receiving comprises receiving said response in the form of said channel adjustment parameter, and further comprising querying said at least one remote modem for said channel adjustment parameter.

27. The method of claim 26, further comprising estimating the FEXT response based on said channel adjustment parameter of said at least one remote modem in response to transmitted precoded symbols.

28. The method of claim 25, further comprising estimating the direct channel response of said at least one remote modem to respective at least one of said plurality of central modems prior to said step of selectively precoding symbols.

29. The method of claim 25, further comprising repeating said selective precoding symbols for a plurality of estimation precoding matrices, and receiving from said at least one remote modem respective channel adjustment parameters in response to transmitted symbols precoded with said plurality of estimation precoding matrices.

30. The method of claim 29, further comprising querying said at least one remote modem for said channel adjustment parameter for each of said plurality of estimating precoding matrices.

31. The method of claim 30, wherein said querying is performed after stabilization of said channel adjustment parameters at said at least one remote modem for each of said plurality of estimating precoding matrices.

32. The method of claim 25, further comprising periodically repeating said estimating Far End Crosstalk (FEXT) response, thereby generating an estimate of said Far End Crosstalk (FEXT) response with each repetition.

33. The method of claim 25, wherein said matrix is calculated as a function of information that is independent of the said far end cross talk (FEXT) response and independent of said direct channel response.

34. The method of claim 25, wherein said plurality of central modems includes a predefined number n of modems;

said at least one remote modem includes said n remote modems;

the channel coefficients between the central modems and the remote modems is modeled as an n×n matrix H, including diagonal elements and off-diagonal elements; and the far end crosstalk response coefficients are the off-diagonal elements of H.

35. The method of claim 34, wherein each of the remote modems has a decision mechanism configured to compute decoded symbols as a function of analog signals received by the each of the remote modems, and any of said estimation precoding matrices is calculated to have the form I+εM wherein ε is significantly less than 1 in absolute value (|ε|<<1);

ε is chosen such that the decision mechanism at the remote modems will not be affected by the precoding; and M is calculated as a first function of said set of selected coefficients, wherein precoding said symbols by said matrix I+εM and transmitting said precoded symbols to said remote modem causes said channel adjustment parameter at said remote modem to converge to a second function of said selected coefficients.

36. The method of claim 35, wherein each of said second function of said selected coefficients is a function of predefined elements of the matrix H(I+εM).

37. The method of claim 36, wherein said predefined elements of the matrix H(I+εM) are diagonal elements of the matrix H(I+εM).

* * * * *

UNITED STATES PATENT AND TRADEMARK OFFICE
CERTIFICATE OF CORRECTION

PATENT NO.       : 8,233,376 B2
APPLICATION NO.  : 12/065531
DATED            : July 31, 2012
INVENTOR(S)      : Ishai Ilani It is certified that error appears in the above-identified patent and that said Letters Patent is hereby corrected as shown below:

Claim 17, column 14, line 46, the word "aid" should be --said--.

Signed and Sealed this
Thirtieth Day of October, 2012

David J. Kappos
*Director of the United States Patent and Trademark Office*